(12) United States Patent
Mota Manhaes et al.

(10) Patent No.: US 11,457,554 B2
(45) Date of Patent: Oct. 4, 2022

(54) MULTI-DIMENSION ARTIFICIAL INTELLIGENCE AGRICULTURE ADVISOR

(71) Applicant: KYNDRYL, INC., New York, NY (US)

(72) Inventors: Marcelo Mota Manhaes, Curitiba (BR); Glaucio Alexandre De Azevedo, Jardim Chapadô (BR); Edson Gomes Pereira, Cotia (BR); Tiago Dias Generoso, Poços de Caldas (BR)

(73) Assignee: KYNDRYL, INC., New York, NY (US)

( * ) Notice: Subject to any disclaimer, the term of this patent is extended or adjusted under 35 U.S.C. 154(b) by 437 days.

(21) Appl. No.: 16/666,483

(22) Filed: Oct. 29, 2019

(65) Prior Publication Data
US 2021/0120731 A1 Apr. 29, 2021

(51) Int. Cl.
*A01B 79/00* (2006.01)
*H04L 67/306* (2022.01)
(Continued)

(52) U.S. Cl.
CPC .......... *A01B 79/005* (2013.01); *A01B 69/008* (2013.01); *G06N 3/004* (2013.01);
(Continued)

(58) Field of Classification Search
CPC .... A01B 69/008; A01B 79/005; G06N 20/00; G06N 3/004; G06N 3/08; G06Q 50/02; H04L 67/306
See application file for complete search history.

(56) References Cited

U.S. PATENT DOCUMENTS

| 5,414,462 A | 5/1995 | Veatch |
| 5,445,178 A | 8/1995 | Feuer |

(Continued)

FOREIGN PATENT DOCUMENTS

| CN | 101587568 A | 11/2009 |
| CN | 103444481 A | 12/2013 |

(Continued)

OTHER PUBLICATIONS

IBM: List of IBM Patents or Patent Applications Treated as Related (Appendix P), Nov. 13, 2019, 2 pages.
(Continued)

*Primary Examiner* — Calvin Cheung
(74) *Attorney, Agent, or Firm* — Erik Swanson; Andrew M. Calderon; Roberts Calderon Safran & Cole, P.C.

(57) ABSTRACT

A method, a computer system, and a computer program product for a multi-dimension artificial intelligence (AI) agriculture advisor is provided. Embodiments of the present invention may include creating a user profile. Embodiments of the present invention may include preparing and transforming the external data. Embodiments of the present invention may include conducting a hypothesis on the transformed data. Embodiments of the present invention may include validating the transformed data. Embodiments of the present invention may include training an artificial intelligence (AI) model based on the transformed data. Embodiments of the present invention may include validating and retraining the artificial intelligence (AI) model. Embodiments of the present invention may include matching the user data with the artificial intelligence (AI) model. Embodiments of the present invention may include ranking results based on the matching the user data with the artificial intelligence (AI) model.

20 Claims, 5 Drawing Sheets

(51) Int. Cl.
*A01B 69/04* (2006.01)
*G06N 3/08* (2006.01)
*G06N 20/00* (2019.01)
*G06N 3/00* (2006.01)
*G06Q 50/02* (2012.01)

(52) U.S. Cl.
CPC .............. *G06N 3/08* (2013.01); *G06N 20/00* (2019.01); *G06Q 50/02* (2013.01); *H04L 67/306* (2013.01)

(56) References Cited

U.S. PATENT DOCUMENTS

| | | | |
|---|---|---|---|
| 5,884,225 | A | 3/1999 | Allen |
| 6,990,459 | B2 | 1/2006 | Schneider |
| 6,995,675 | B2 | 2/2006 | Curkendall |
| 9,031,884 | B1* | 5/2015 | Mewes ................ A01G 13/00 706/12 |
| 10,028,451 | B2 | 7/2018 | Rowan |
| 2002/0095232 | A1 | 7/2002 | Jorgenson |
| 2002/0183867 | A1 | 12/2002 | Gupta |
| 2003/0012411 | A1 | 1/2003 | Sjostrom |
| 2010/0015713 | A1 | 1/2010 | Deeter |
| 2013/0185104 | A1 | 7/2013 | Klavins |
| 2014/0018976 | A1 | 1/2014 | Goossen |
| 2014/0058775 | A1 | 2/2014 | Siig |
| 2014/0067745 | A1 | 3/2014 | Avey |
| 2016/0078375 | A1 | 3/2016 | Ethington |
| 2016/0078570 | A1 | 3/2016 | Ethington |
| 2016/0147962 | A1* | 5/2016 | Vollmar ................ H04W 4/029 705/2 |
| 2016/0202227 | A1* | 7/2016 | Mathur ................. G06Q 50/02 702/2 |
| 2016/0247082 | A1 | 8/2016 | Sterling |
| 2016/0292248 | A1* | 10/2016 | Garcia ................... G06F 17/18 |
| 2018/0059691 | A1 | 3/2018 | Fleming |
| 2018/0177136 | A1 | 6/2018 | Reimann |
| 2020/0117173 | A1* | 4/2020 | Terres ................... A01G 25/16 |
| 2020/0273172 | A1* | 8/2020 | Weldemariam .......... G06N 3/08 |

FOREIGN PATENT DOCUMENTS

| | | |
|---|---|---|
| CN | 204119273 U | 1/2015 |
| CN | 104715330 A | 6/2015 |
| CN | 104732435 A | 6/2015 |
| CN | 204514798 U | 7/2015 |
| CN | 105872491 A | 8/2016 |
| CN | 106548355 A | 3/2017 |
| CN | 107145506 A | 9/2017 |
| CN | 107256504 A | 10/2017 |
| CN | 108876229 A | 11/2018 |
| JP | 2019128741 A * 8/2019 ........... B64C 39/024 |
| WO | 201134540 A1 | 3/2011 |

OTHER PUBLICATIONS

Pending U.S. Appl. No. 16/666,476, filed Oct. 29, 2019, entitled: "Artificial Intelligence Logistics Support for Agribusiness Production", 44 pages.

Auernhammer, "Precision farming-the environmental challenge", ScienceDirect, Computers and Electronics in Agriculture, vol. 30, Issues 1-3, Feb. 2001, pp. 31-43, Abstract, https://www.sciencedirect.com/science/article/pii/S0168169900001538.

Barbosa, "IBM wants to be more agile", Updated May 30, 2017, Rural Money, Dinheiro Rural, 6 pages.

Bjerga et al., "American farmers are losing billions from Trump's trade war—but they're still supporting him", Financial Post, Jul. 17, 2018 8 pages.

Carberry et al., "The FARMSCAPE approach to decision support: farmer's, adviser's, researchers' monitoring, simulation, communication and performance evaluation", Near-final version of Agricultural Systems 74 (2002) pp. 141-177.

Croplife International, "Agriculture: A $2.4 Trillion Industry Worth Protecting", Oct. 7, 2015, https://croplife.org/news/agriculture-a-2-4-trillion-industry-worth-protecting/, 4 pages.

Fuentes et al., "Supporting small-scale dairy plants in selecting market opportunities and milk payment systems using a spreadsheet model", ScienceDirect, Computers ans Electronics in Agriculture, vol. 122, Mar. 2016, pp. 191-199, Original papers, Abstract, https://www.sciencedirect.com/science/article/pii/S0168169916000338.

Giles, "The Top 7 Challenges for Small Farms in Florida", Aug. 26, 2018, https://www.growingproduce.com/fruits/top-7-challenges-small-farms/, 9 pages.

https://www.theweathernetwork.com/roads-and-travel/highway-condition/list, "Current Highway Conditions—The Weather Network", Accessed on Jun. 17, 2019, 1 page.

Humphries et al., "Computer-aided management of plant tissue culture production", ScienceDirect, Computers and Electronics in Agriculture, vol. 6, Issue 1, Jul. 1991, pp. 33-49, Abstract, https://www.sciencedirect.com/science/article/pii/016816999190021Z.

IBM, "How modern agriculture technology and IoT data can improve harvests, sustainability, and quality", https://www.ibm.com/weather/industries/agriculture, Accessed on Jun. 17, 2019, 4 pages.

IBM, "IBM Cloud"https://www.IBM.com/us-en/marketplace/agri-resrch-innov, Accessed on Mar. 15, 2019, 7 pages.

Lacasta et al., "Agricultural recommendation system for crop protection", ScienceDirect, Computers and Electronics in Agriculture, vol. 152, Sep. 2018, pp. 82-89, Abstract, https://www.sciencedirect.com/science/article/pii/50168169917315260.

Liakos et al., "Machine Learning in Agriculture: A Review", sensors, MDPI, Published Aug. 14, 2018, 29 pages.

Meirelles et al., "Data mining in the reduction of the number of places of experiments for plant cultivates", ScienceDirect, Computers and Electronics in Agriculture, vol. 113, Apr. 2015, pp. 136-147, Abstract, https://www.sciencedirect.com/science/article/pii/S0168169915000484.

Minet et al., "Crowdsourcing for agricultural applications: A review of uses and opportunities for a farmsourcing approach", ScienceDirect, Computers and Electronics in Agriculture, vol. 142, Part A, Nov. 2017, pp. 126-138, Abstract, https://www.sciencedirect.com/science/article/pii/S0168169917300479.

Ratnayake et al., "Advising Farmers on Crop Selecting Using an Expert System", Conference Paper, Oct. 2008, 8 pages, Proceedings of the fifth Annual Sessions, https://www.researchgate.net/publication/311485406_Advising_Farmers_on_Crop_Selecting_Using_an_Expert_System.

Roussey et al., "A methodology for the publication of agricultural alert bulletins as LOD", ScienceDirect, Computers and Electronics in Agriculture, vol. 142, Part B, Nov. 2017, pp. 632-650, Abstract, https://www.sciencedirect.com/science/article/pii/S0168169917306361.

Sputnik International Search, "Italian Agriculture Loses Three Bln Euros Annually Due to Russian Sanctions", Mar. 17, 2018, Opinion, 3 pages.

The Weather Network, "Maps: Highway Forecast—The Weather Network", https://www.theweathernetwork.com/maps/highway-forecast, , Accessed on Jun. 17, 2019, 1 page.

Wolfenson, "Coping with the food and agriculture challenge: smallholders' agenda", Preparations and outcomes of the 2012 United nations Conference on Sustainable Development, Rome, Apr. 2013, revised Jul. 2013, 50 pages.

Mell et al., "The NIST Definition of Cloud Computing", Recommendations of the National Institute of Standards and Technology, Special Publication 800-145, Sep. 2011, 7 pages.

* cited by examiner

MULTI-DIMENSION ARTIFICIAL INTELLIGENCE AGRICULTURE ADVISOR

BACKGROUND

The present invention relates generally to the field of computing, and more particularly to artificial intelligence. Agricultural resources may not be efficiently utilized due to various factors such as market variations, population shifts, transport issues or unanticipated and fluctuating weather patterns. The factors, as related to the agriculture industry and agribusiness, may also impact logistics, production flow and product quality. Predictive capabilities based on changes that can occur during the production and transportation of a product are limited and continuously shifting factors may cause an agribusiness imbalance of product or supply compared to the current demands.

SUMMARY

Embodiments of the present invention disclose a method, a computer system, and a computer program product for a multi-dimension artificial intelligence (AI) agriculture advisor. Embodiments of the present invention may include receiving user data. Embodiments of the present invention may include collecting additional data and external data. Embodiments of the present invention may include creating a user profile. Embodiments of the present invention may include preparing and transforming the external data, wherein the external data is used to create transformed data. Embodiments of the present invention may include conducting a hypothesis on the transformed data. Embodiments of the present invention may include validating the transformed data. Embodiments of the present invention may include training an artificial intelligence (AI) model based on the transformed data. Embodiments of the present invention may include validating and retraining the artificial intelligence (AI) model. Embodiments of the present invention may include matching the user data with the artificial intelligence (AI) model. Embodiments of the present invention may include ranking results based on the matching the user data with the artificial intelligence (AI) model.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
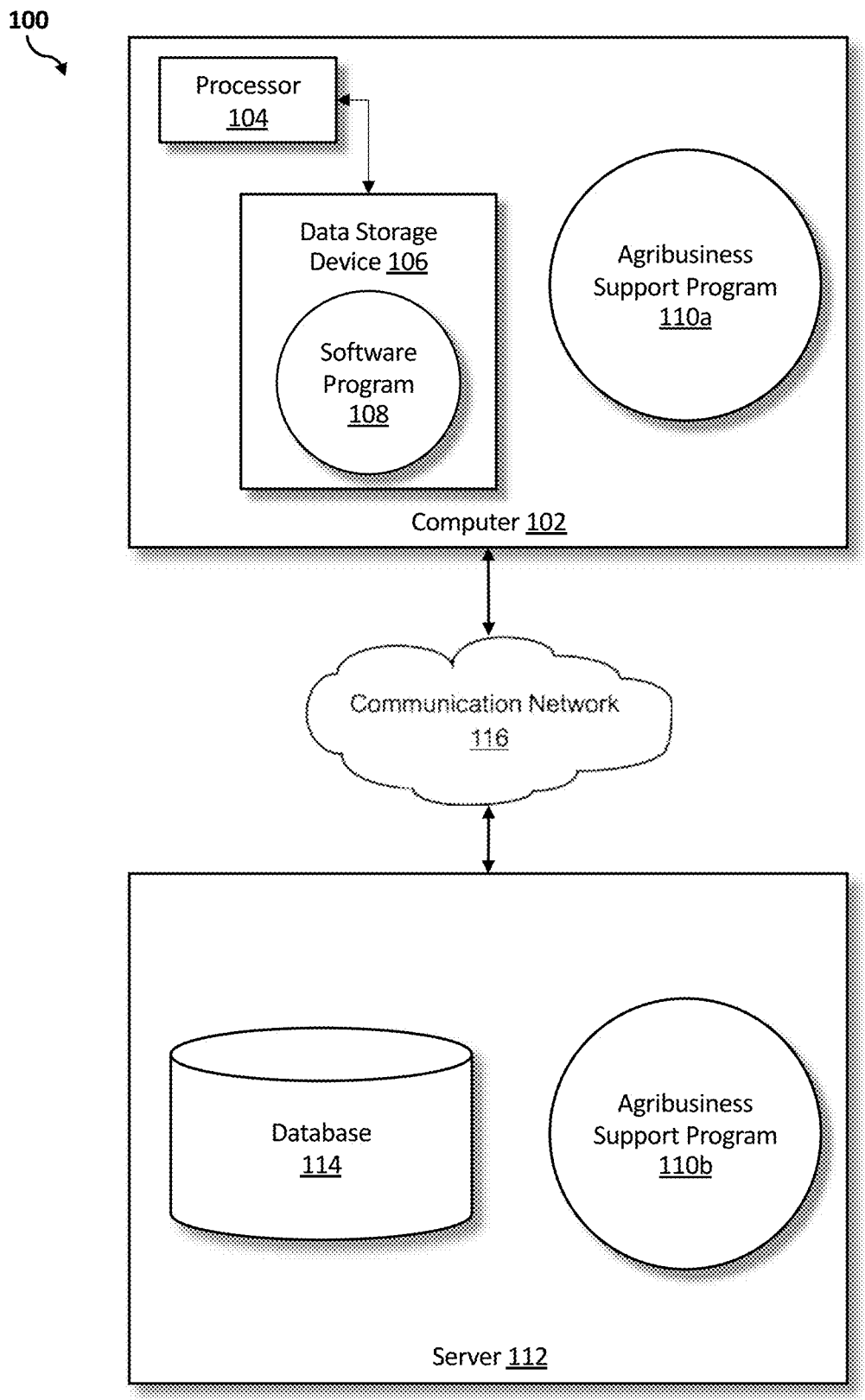
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, agricultural resources may not be efficiently utilized due to various factors such as market variations, population shifts, transport issues or unanticipated and fluctuating weather patterns. The factors, as related to the agriculture industry and agribusiness, may also impact logistics, production flow and product quality. Predictive capabilities based on changes that can occur during the production and transportation of a product are limited and continuously shifting factors may cause an agribusiness imbalance of product or supply compared to the current demands.

One scenario that may affect agriculture resources may include, for example, a farmer losing a crop due to unanticipated weather patterns or may lose products due to transportation issues. Investments made by a farmer to provide agricultural products to a consumer may include infrastructure, farming equipment, labor, seeds and soil products. Some of the investment may be lost if the product does not make it to the consumer. Therefore, it may be advantageous to, among other things, assist agricultural producers in mitigating and minimizing risks due to many unforeseeable factors by providing technological improvements and predictive capabilities to the agricultural industry.

The following described exemplary embodiments provide a system, method and program product for an artificial intelligence (AI) based agriculture management and harvesting advisor. As such, embodiments of the present invention have the capacity to improve the agriculture industry by providing AI based analytics to evaluate and predict an optimal amount of resources, the optimal agriculture investments and a continuous learning and optimization of agriculture resources and locations. More specifically, a custom AI based agriculture management and harvesting system, method and program product may create resource strategies for the production of crops by collecting various data and creating AI and machine learning (ML) models using cognitive capabilities with structured and unstructured data to determine optimal predictive insights relating to specialized planting, harvesting and social demand advice.

Additional benefits may include using the built and trained models to assist farmers with crop production while considering aspects to crop production that impact the production. Using the collected information to build models that predict an optimal amount of resources produced based on demand from a farm using optimal soil and less land space will be passed to the end consumer by increasing the freshness of cultivated product and reducing the cost.

Further advantages include an end user supply and demand management prediction result by analyzing population influx, outflux and current social trends in demand which allows a farmer to plan the production of a crop while considering the current and historical demands to reduce waste. Agribusiness logistics will be improved by allowing transport services access to information for optimal timing and route planning and to support the demand near the time of production to ensure the produced products do not spoil. Transport services that are allowed access to more information relating to optimal planning may have the ability to identify dates and places for transport needs ahead of time, based on the AI and ML model predictions.

Agribusiness production flow will be improved by globally linking farmers with companies and buyers who may sell the produced resources without the risk of waiting, which increases product quality and decreases product loss for fresh foods sought by the companies, buyers or end consumers. Product quality to the end consumer will benefit from the improved timing and planning in cultivating crops based on historical and current scientific data obtained and analyzed. A robust database or knowledgebase will be built to improve statistical information and the data can be used by interested companies related to agribusiness, such as seed companies, agriculture research companies, financial companies who may invest in agribusiness, logistic providers and other producers that plan on cultivating crops. Agribusiness production flow improvements may assist in getting fresh food resources to other territories and other locations whose populations are typically difficult to reach while decreasing the cost of production due to improved crop harvest (i.e., crop cultures or crop cultivations) timing and improved logistics.

According to an embodiment, an improved agriculture industry or agribusiness will include a multi-dimensional AI approach to maximizing agricultural resource management by incorporating social platforms, weather platforms, Internet of Things (IoT) platforms, scientific platforms, investment platforms, current event platforms, logistical platforms, topology or map platforms and location platforms. The multi-dimensional approach may, for example, reduce resource waste and find a cost-effective approach to providing fresh resources to the consumer. Additionally, a predictive capability to the supply and demand for resources may create a cohesive environment with less waste regarding the amount of food that is required for a region and the amount of food that is provided for the region.

According to an embodiment, resources may include, for example, land, capital, labor, water, machinery and chemicals or soil related products in the context of agriculture management objectives. Various types of data may be collected and imported relating to the farm, third-party industries, social media data, weather data, scientific data, collaborator data, transactional data, financial data, map and topology data, event data, logistical data and public service announcement data. Data relating to agriculture management objectives may be collected and imported from databases that contain historical data and from devices that collect current or real-time data. Additionally, data may also be imported relating to consumer usage, preferences, feedback, surveys or other data that a consumer or an end-user may approve of providing for the purpose of agriculture resource management.

Historical data and current data may be retrieved, imported and collected from various computing devices and sensors and stored on a database, corpus or knowledgebase to be used for analysis. Current data may, for example, be received from an internet of things (IoT) device, a global positioning system (GPS), a sensor, a smart watch, a smart phone, a smart tablet, a personal computer or an automotive device. Current data may generally refer to, for example, information relating to data obtained in real-time from IoT sensors, weather company data, financial data, logistical data, map database data, current events data or public service announcements. Historical data may include, for example, land data, labor data, employee data, weather data, market data, population data, ML training data, consumer preferences, consumer feedback and consumer demand for a resource. Data that is imported as current data may then become historical data and the data collecting cycle may continue.

Historical and current data examples received and collected from various devices and public internet repositories may include IoT inputs of soil moisture, climate conditions, geo locations and water availability; weather companies to check and compare climate conditions over a period of time; public service announcements about government regulations; financial services to compare resource costs; maps databases to obtain the coordinates, location, topology or geology of a property or a farm; logistics databases to analyze for determining the best resource delivery routes relating to traffic, distance and number of deliveries on a particular route; events databases to analyze current events globally as variables relating to potential resource expansions or restrictions; collaborator data to include special advisors who may assist users or farmers in special circumstances such as how to avoid crop erosion from an insect or an animal species that has invaded the crop; social media data to collect new and existing news related to the agriculture supply chain; and scientific articles to collect the most recent research to match the harvest to climate, land or region conditions. A collaborator may include, for example, agribusiness or science-based SMEs or other experienced farmers who may have knowledge or expertise for a special circumstance. The collaborators may provide particular guidance or advise relating the special circumstance.

According to an embodiment, the collected data may be used for analyses, to build AI and ML models to predict the optimal amount of resources that may be needed to reduce waste, to minimize risk, to reduce costs, to fill consumer needs and to capitalize on land use. Various types of models may be built to create predictive results for agriculture or agribusiness related results. Models may also include deep learning models using neural networks. Training and updating a ML model may include supervised, unsupervised and semi-supervised ML procedures. Supervised learning may use a labeled dataset or a labeled training set to build, train and update a model. Unsupervised learning may use all unlabeled data to train a deep learning model. Semi-supervised learning may use both labeled datasets and unlabeled datasets to train a deep learning model.

Supervised learning and semi-supervised learning may incorporate ground truth by having an individual check the accuracy of the data, data labels and data classifications. Individuals are typically a subject matter expert (SME) who have extensive knowledge in the particular domain of the dataset. The SME input may represent ground truth for the ML model and the provided ground truth may raise the accuracy of the model. The SME may correct, amend, update or remove the classification of the data or data labels by manually updating the labeled dataset.

According to an embodiment, supervised or semi-supervised ML may be used to allow an individual (e.g., a user, a SME, an expert or an administrator) to have some control over the ML model by having the ability to validate, alter, update or change the training set. SMEs may provide input or feedback into a ML model by altering the training set as opposed to an unsupervised ML environment, when a SME may not provide input to the data.

Various cognitive analyses may be used, such as natural language processing (NLP), semantic analysis and sentiment analysis during the building and training of a ML model. The cognitive analytics may analyze both structured and unstructured data to be incorporated into the ML process. NLP may be used to analyze the quality of data, feedback or a conversation based on the received data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. The received data may be processed through NLP to extract information that is meaningful to a user.

Semantic analysis may be used to infer the complexity, meaning and intent of interactions based on the collected and stored data, both verbal and non-verbal. For example, verbal data may include data collected by a microphone that collects the user dialog for voice analysis to infer the emotion level of the user. Non-verbal data may include, for example, text-based data or type written words, such as a social media post, a public service announcement, collaborator data communication, a text message, an instant message or an email message. Semantic analysis may also consider syntactic structures at various levels to infer meaning to words, phrases, sentences and paragraphs used by the user.

Sentiment analysis may be used to understand how communication may be received by a user or interpreted by the user. Sentiment analysis may be processed through, for example, voice identifier software received by a microphone, facial expression identifier software received by a camera or biometric identifier software received by an augmented reality device, a smart phone or a wearable device such as a smart watch. Sentiment may also be measured by the tone of voice of the individuals communicating and the syntactic tone in type-written messages, such as a social media post, a text message or an email message.

According to an embodiment, for real-time data being collected and accessed, such as user preference data, user profile data or external source data collected form a user, the data may be transmitted to and received by computing devices by receiving consent from the consumer, via an opt-in feature or an opt-out feature, prior to commencing the collecting of data or the monitoring and analyzing of the collected data. For example, in some embodiments, the consumer may be notified when the collection of data begins via a graphical user interface (GUI) or a screen on a computing device or smart phone. The user may be provided with a prompt or a notification to acknowledge an opt-in feature or an opt-out feature.

According to an embodiment, a ML model may be trained to provide specialized planting and harvesting predictions and advice. The predictions and advice may include, for example, an alert, a text message, an email message, or a real-time notification to the user device describing the soil, location and area conditions for a particular farm or crop of interest. In the current embodiment, the user may be a farmer. The alert message to the farmer containing information relating to the soil, location and area conditions may be converted into terms that a farmer may use. For example, an SME, a scientist or an agribusiness expert may provide support in terms of information assisting to solve typical and specialized farming issues, however, the terms a SME uses may differ from a farmer. Therefore, the terms used to provide the notification, alert or information to the farmer may include the type of language and verbiage a farmer may use and less technically scientific words. ML models, AI models and data mining techniques may be used to collect and analyze data related to social demand for a particular crop and then a list of farms close to the high demand regions may be identified based on social media, weather, transport and breaking news information. For example, an AI model may determine, based on the collected data, the best strategy for managing the soil, the crop, the use of pesticides, the use of pollinators and the outflow of production associated with agriculture terms. For example, determining agriculture terms may include identifying a specific pesticide that can be used if the crop will be exported to another country or region that has differing local traditions and laws. Local restrictions may change the way to export a product and may change the best way to transport a product, for example, a government incentive for using a specific type of transport procedures could reduce the fees of transportation. A ML model may be built based on the collected data and SME input data may be optional to improve the ML model results. The built ML model may include a predefined set of semantic features associated with the user's input and public, domain specific content, such as scientific articles, and private predefined dataset features, such as government databases with agriculture information.

The built ML model may suggest one or more social groups that match the user's input, IoT and predefined set of features. The ML model may be retrained based on user feedback, new or updated data from, for example, scientific articles on agriculture, social media posts, news or weather data that is updated to a knowledgebase that is used to build and process the ML models.

A use case example includes a farmer who produces coffee beans in a high-altitude location that has cooler temperatures, which are optimal conditions for harvesting coffee beans. Over time, the regular amount of rain has decrease and the weather patterns have shifted to a warmer average temperature, which may create harvesting issues for the farmer. With fluctuations in the amount of coffee beans that the crops are able to harvest under the changing external conditions, the cost of the coffee beans have risen to the end consumer since the amount of supply, especially the amount of optimal quality supply, has diminished. The changing harvest amounts and costs have created an unstable farming environment.

The coffee bean farmer may use the agribusiness support program to improve farming and crops by using additional sources to expand and enhance the products to harvest and sell. Additional sources that are not typically available to a farmer, such as SME expertise, scientific data, predicted weather patterns, social demands or population shifts. The agribusiness support program may provide the farmer with alternative products to harvest on a farm in a high altitude, additional soil maintenance and harvesting techniques or current information relating to an increase or decrease in demand for certain products. The agribusiness support program will assist the farmer in maximizing the farmland using the current conditions and will allow the farmer to adjust based on current events.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an agribusiness support program 110a. The networked computer environment 100 may also include a server 112 that is enabled to run an agribusiness support program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the agribusiness support program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the agribusiness support program 110a, 110b (respectively) to dynamically support agribusiness by building a multi-dimension artificial intelligence (AI) agriculture advisor. The agribusiness support method is explained in more detail below with respect to FIG. 2.

Figure 2:
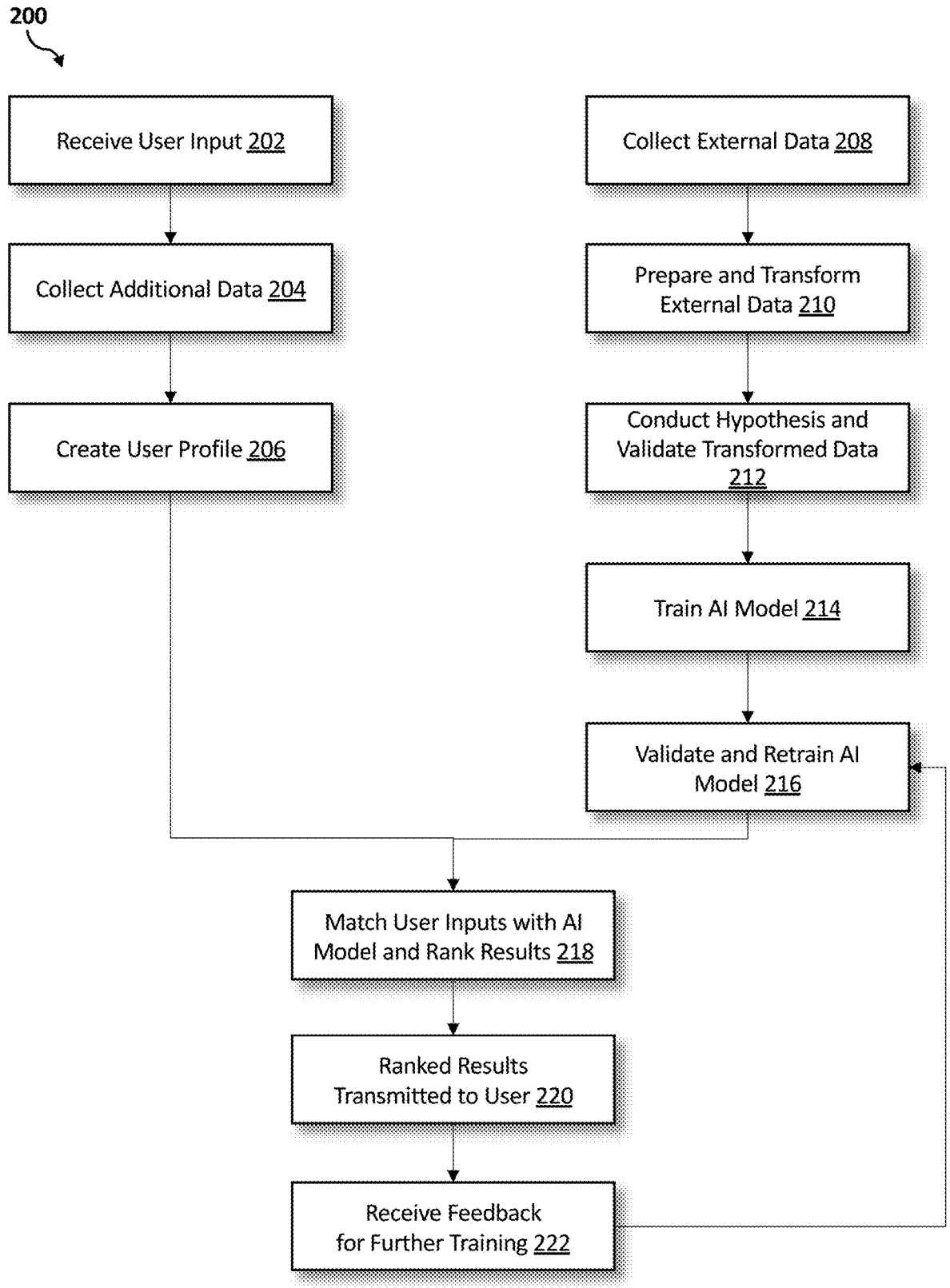
FIG. 2 is an operational flowchart illustrating a process for building a multi-dimension artificial intelligence (AI) agriculture advisor for agribusiness support according to at least one embodiment.

Referring now to FIG. 2, an operational flowchart illustrating the exemplary agribusiness support process 200 used by the agribusiness support program 110a, 110b according to at least one embodiment is depicted.

At 202, user input is received. User input may include data that will be used to create a profile, for example, a user profile for a farmer that may want to maximize the farming techniques on farmland for optimal output and minimal waste. The user input data may include, for example, a name, a company name, an address, an initial budget, type of crops, types of products, location of farms, farm equipment, farm resources and employee information, such as how many employees. The user data is stored on a database or knowledgebase.

At 204, additional data is collected. Additional collected or received data may include soil mixture data obtained by an IoT devices, types of soil products used for farming, pH values, weather conditions, topology and geology information from a map application. Map application data and IoT devices may produce additional data, such as, a GPS latitude, a GPS longitude, a GPS altitude, a minimum temperature, a maximum temperature, an average temperature, a soil PH value, electrical conductivity, a percentage of exchangeable sodium, atmospheric or barometric pressure or a current or average wind speed. Weather condition data may include average minimum and maximum temperatures and average precipitation for each month of the year. Property zoning and land size data may be obtained via public records as additional data.

At 206, a user profile is created. The user input collected at step 202 and the additional data collected at step 204 are used to create a user profile. The user input and the additional data is combined and stored on a repository for each user or farmer. Each user may have varying amounts of collected data based on the user location, the farm location, city, state, country or types of crops harvested. The profile for each user is stored for future matching of profile data with predictive results from ML models.

At 208, external data is collected. External data may be collected using web crawlers or bots to collect information and information dimensions relating to external factors such as weather, public services, agriculture news, financial news, logistics, scientific data, current global events or collaborator data from supply chain agriculture advisors. Information dimensions may represent each source that a web crawler collects data from. Each dimension or source may include sub-dimensions. For example, scientific articles may be one dimension for each different type of harvest that a farmer may cultivate, such as sub-dimensions of rice, wheat or soy. The collected external data may be obtained in structured (e.g., database tables) or unstructured formats, such as HTML, images, word processing documents, text files or PDF documents.

External data may also include SME data. SME data may provide subject matter and regional expertise in terms of data classifications, labels and definitions. SMEs may be used to define parameters and annotate data. SME data may advance the analytics by, for example, further clarifying datasets classifications related to NLP analysis, sentiment analysis, semantic analysis or relationship extraction analysis as ground truth for the machine learning process.

The SME may support the machine learning process, supervised or semi-supervised machine learning, by assisting in building an ontology by translating language definitions for particular regions, dimensions and websites. The SME may be a local resident or an expert in science, meteorology for weather expertise, legal structures, government structures and laws relating to farms, labor, trade or resources, economic and finance structures, agriculture, logistics or global transportation.

At 210, external data is prepared and transformed. External data may include either or both structured or unstructured data. For each external factor, such as a weather website, a current event website, a public service announcement website or a scientific journal website, a web crawler may wrangle the external data to integrate the data from several of the external factors or data sources. Wrangling data may include the process of collecting the external data by crawling the data from web-based sources. The external data may be normalized in order to consistently merge the data from multiple datasets. The external data may also be parsed into structured data and both forms, structured data and unstructured data, may be stored for further use. For example, structured data is used for AI models and unstructured data is used to define an answer justifying the documents relating to future alert dashboards and for support of a hypothesis. In preparation, the data may then, for example, be converted to be used for data analytics and to train a machine learning model in a format such as a comma-separated values (CSV) format or a JavaScript object notation (JSON) format. Once converted, the data may become a training dataset for a machine learning model.

The training dataset may be cleansed or repaired for inconsistencies, missing values, insufficient parameters or incorrect delimiters, for example, in the CSV format. Cleansing the data may include a process of detecting and correcting, or removing, corrupt, invalid or inaccurate data. If the data cannot be repaired, then the section of data that cannot be repaired will be removed. Once the cleansing and syntactic checking has been accomplished, a semantic check will be accomplished by checking for outliers or for outlier verification. Outlier verification may include an alternative approach to fault detection based on limit checking with constant or linear thresholds. Training datasets may be created for different domains or dimensions, such as a current events training dataset, a scientific training dataset or a resource and production cost training dataset, a social demand or social media dataset or a weather condition dataset.

The data preparation process may now be transformed, such as normalized, to transform the categorical data into numerical values to build a more efficient machine learning model that produces a higher amount of predictive accuracy by using hot encoding techniques. Since each dimension can produce different types of data sources with differing formats, differing languages, and from differing regions, the cleansing and normalizing to use hot encoding techniques, by a hot encoder, provides greater accuracy during the training phase of the machine learning process. The hot encoder may be used for advanced text analytics, such as adding additional columns to account for added dimensions to train the machine learning model for enriched validation inside the text. Enriched validation may include, for example, adding new columns for dimensions that will improve a ML model. Additionally, when the data preparation analyzes an external source, such as an economic news database for rice crops, then the enriched column may be considered the sentiment analysis of the economic news dimension. Additional columns may include NLP or SME added economical sentiment, weather sentiment or social demand relating to products. Data curation may also be used to ingest the data and convert the data to a standard format, enrich the data using semantic analyzers and normalize the data.

At 212, hypotheses are conducted, and the transformed data is validated. Hypotheses may be conducted to build scenarios based on types of product, for example, types of crops planted in particular regions that align with what the particular region's social demands are on the types of crops. For example, answer justified documents (AJDs) may be used with the created advanced text analytics produced in step 210 to conduct hypotheses as in Table 1.

| Product | Region/City | Economic Sentiment | Weather Prediction Sentiment | Public Service Sentiment | Science Validation |
| --- | --- | --- | --- | --- | --- |
| Rice | Region 1 | 1 (positive) | 0 (neutral) | 0 (neutral) | 0 (neutral) |
| Wheat | Region 2 | −1 (negative) | 1 (positive) | 0 (neutral) | 1 (positive) |
| Soy | Region 3 | 1 (positive) | −1 (negative) | 1 (positive) | −1 (negative) |

The conducted hypotheses may be used to validate and merge conflicting data, such as if one region states a negative sentiment relating to soy and the same region has a positive sentiment associated with soy, then verification will be used to verify the source information and reliability. Upon verifying the source information and reliability of the data, the information may be kept or discarded by the less reliable source. The less reliable source may have a lower score associated with the information. The score of each source for each dimension may be defined, for example, by a SME. The output for conduced hypothesis and validation may include a dataset containing the analyzed dimensions.

At 214, an AI model is trained. The AI model may be trained using neural networks and deep learning techniques to create an AI model to predict, for example, support for farmers and agribusiness. Supervised and semi-supervised learning may be used to train the AI model to incorporate SME input and expert training. The SME advise may be used to extract meaningful information based on the hypotheses conducted and data that is validated in step 212. The SME input may also provide added information from the wrangling phase in step 210 that may improve the quality and refine the feature selection to build and train the AI model. For example, the model is trained to predict if a farmer should plant a certain crop based on a multitude of external factors and SME input, such as current events, abnormal weather patterns, new scientific data, optimal soil pH values, population influx or outflux or social demand changes. The transformed and validated data may be used to initially train the ML model and SME input may further refine the AI model.

At 216, the AI model is validated and retrained. AI model may be validated, retrained and tested using datasets may be implemented using both trained sets of data and new sets of incoming current data. Machine learning, such as using a neural network model, may be used to validate and test the transformed and validated data. Machine learning validation may be used to calibrate the model to combine layers in the neural network and the test set of data may validate against a normalized accuracy, such as using F1 score, precision and recall.

The F1 score may include a measurement to gauge prediction performance by using a binary classification and measuring the accuracy, precision and recall. The F1 score may be a compound metric of the precision and recall. The precision may include a data query relationship between relevant data and retrieved data such that the number of correct relevant data results may be divided by the total number of retrieved data results. Recall may include a data retrieval relationship between the total retrieved data and the successfully retrieved data such that the recall is the number of correct data results divided by the number of results that should have been provided. The compound metric, F1, also known as the F-score, the F-measure and the F1 score, measures accuracy using precision and recall such that the value of 1 is the optimal value of the harmonic average between the precision and the recall and 0 is the least optimal value.

AI models at each dimension may be trained, tested and validated, for example, as blind sets and based on SME input. A blind set may include, for example, a set of annotated documents used for model testing. At each dimension, if the performance meets a predetermined threshold of accuracy, such as 80% of precision, recall or F1 score, then the model may be validated. If the predetermined threshold of accuracy is not met, then the model may be retrained and more SME input may be used until the model is ready for use, for production use.

AI model calibrating on a testing dataset may be used to get the best possible precision measure. The precision measure may be instrumental in deciding a risk measure. Calibrating the testing data may include a process to improve the precision with further testing and validation loops by analyzing mistakes in predictions.

At 218, the user inputs are matched with the AI model and the results are ranked. The precision measure at step 216 may assist in deciding the risk measure, which is used to match the AI model output with the user profiles. The agribusiness support program 110a, 110b, may match the user, for example, the farmer profile with the model predictions and rank the results. The user profile may be analyzed by transforming the user profile data into a machine learning model format, such as a comma-separated values (CSV) format or a JavaScript object notation (JSON) format. An optimization model, such as a Bayesian optimization, may be used to compare the alternatives to be ranked considering the risks to the user. The alternatives may include all possible outputs and then the outputs are ranked. For example, option 1 is to plant 50% rice and 50% to plant wheat and option 2 is to plant 25% soy and 75% corn. The optimization model may rank one of the options, option 1 or option 2, for the farmer based on risk and potential profits. The dimensions may be compared, for example, social demands may be compared with crop optimizations based on weather patterns and the results may be ranked based on costs, risk levels, potential profits or land optimization.

At 220, the ranked results are provided to the user. The ranking that was created at step 218 may be transmitted to the user, for example, via an alert, an email or a text message to allow the user to store the results. The ranking may also be provided to the user in real time on a web-based application connected to a cloud-based infrastructure. The deployed AI model output provided to the user may use, for example, REST APIs to allow the data to be available to the user via a smart phone a smart tablet or a smart watch. An example AI model output may include a summary of results shown in Table 3.

TABLE 3

| Harvest | Planting Time | Financial Investment | Predicted Harvest Yield | Risk Classification |
| --- | --- | --- | --- | --- |
| Coffee and Wheat | 3 months | $50,000 | $25,000 | Medium |
| Coffee | 2, 5 months | $45,000 | $25,000 | High |
| Wheat and Tomatoes | 3, 5 months | $48,000 | $17,000 | Low |
| Coffee and Tomatoes | 3, 5 months | $52,000 | $15,000 | Medium |
| Wheat | 3 months | $35,000 | $20,000 | High |

The harvest may be the resources needed to create coffee and wheat crops for a season, the time may indicate how long the harvest will take to produce the product to sell, the financial investment may include the cost of purchasing the resources needed, the predicted harvest yield may indicate a potential profit based on the harvest and a risk classification may indicate the level of risk the harvest may be for a farmer to plant single or combined variations harvests.

At 222, the user provides feedback for further training. User feedback may be collected from a user, for example, once the ranked results are saved and the case can be scored after a time period, such as when a farmer or user harvests some crops. The user may score the predictions based on the accuracy of the result and the score provides feedback regarding the AI model predictions. For example, scoring 1-10 with 1 being predictions that were not accurate and 10 being highly accurate predictions with a section for text or type-written feedback, similar to customer reviews when purchasing items online or an emailed survey. The feedback may be monitored and analyzed for changes and the feedback may be managed for continual learning and retraining for one or more AI models created each dimension of combined dimensions.

It may be appreciated that FIG. 2 provide only an illustration of one embodiment and do not imply any limitations with regard to how different embodiments may be implemented. Many modifications to the depicted embodiment(s) may be made based on design and implementation requirements.

Figure 3:
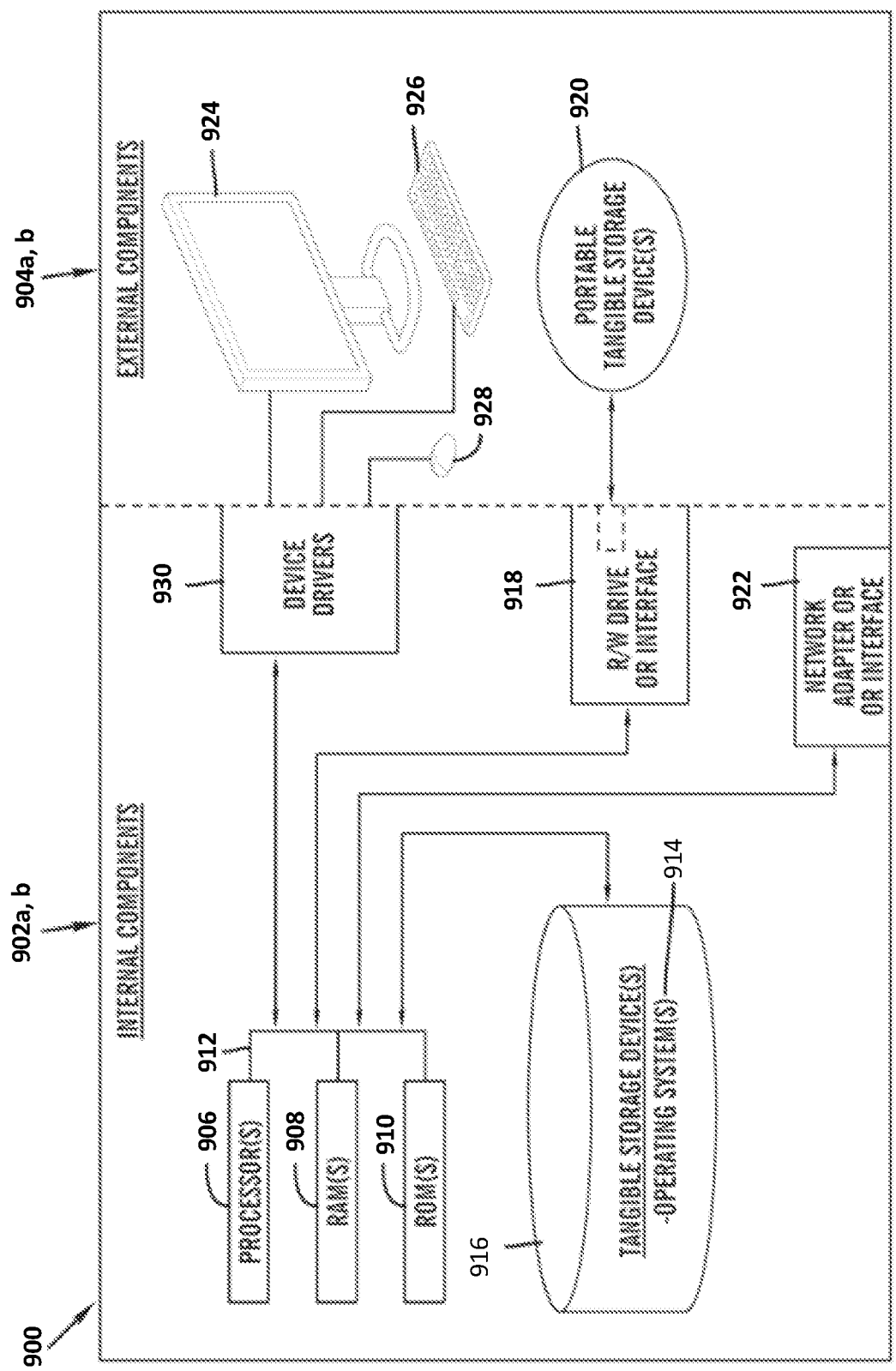
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the agribusiness support program 110a in client computer 102, and the agribusiness support program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the agribusiness support program 110*a*, 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the agribusiness support program 110*a* in client computer 102 and the agribusiness support program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the agribusiness support program 110*a* in client computer 102 and the agribusiness support program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
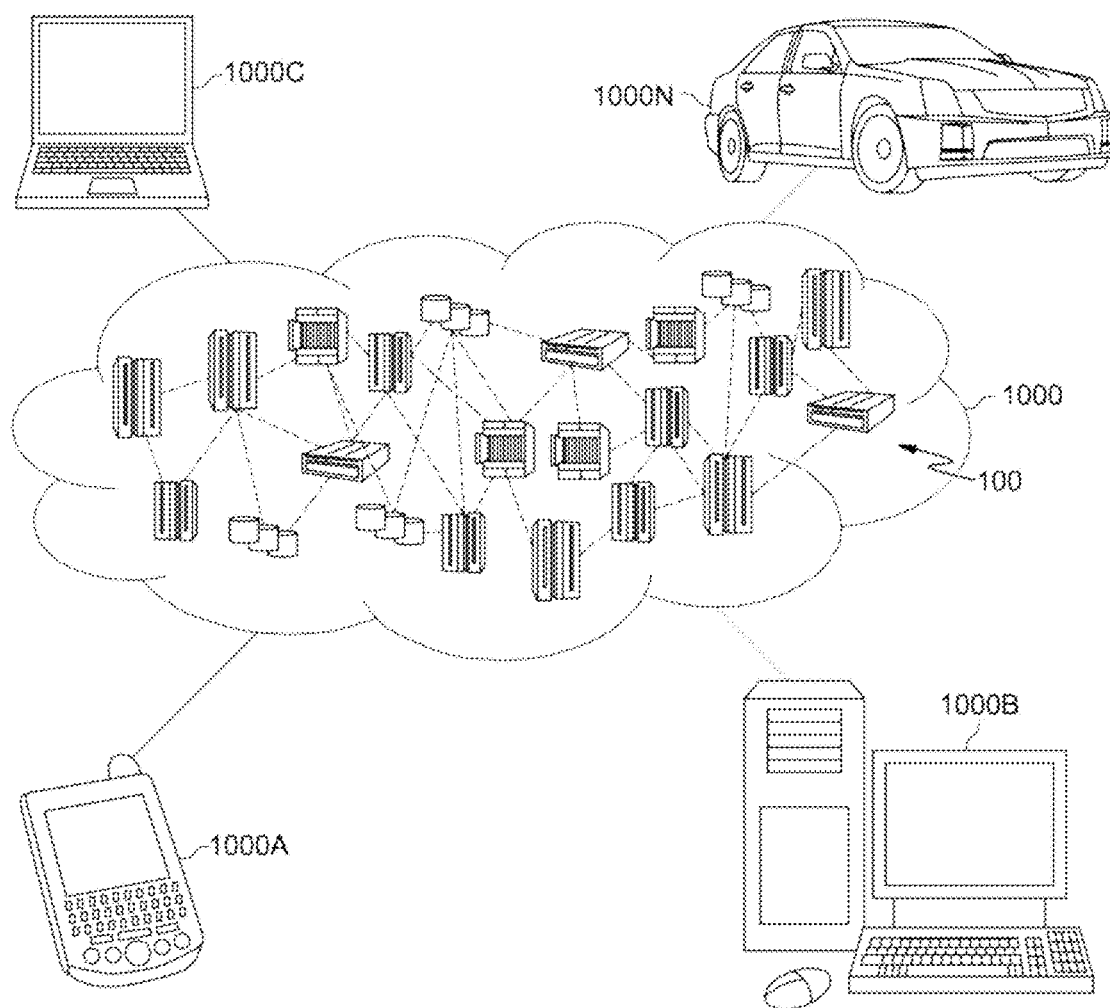
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
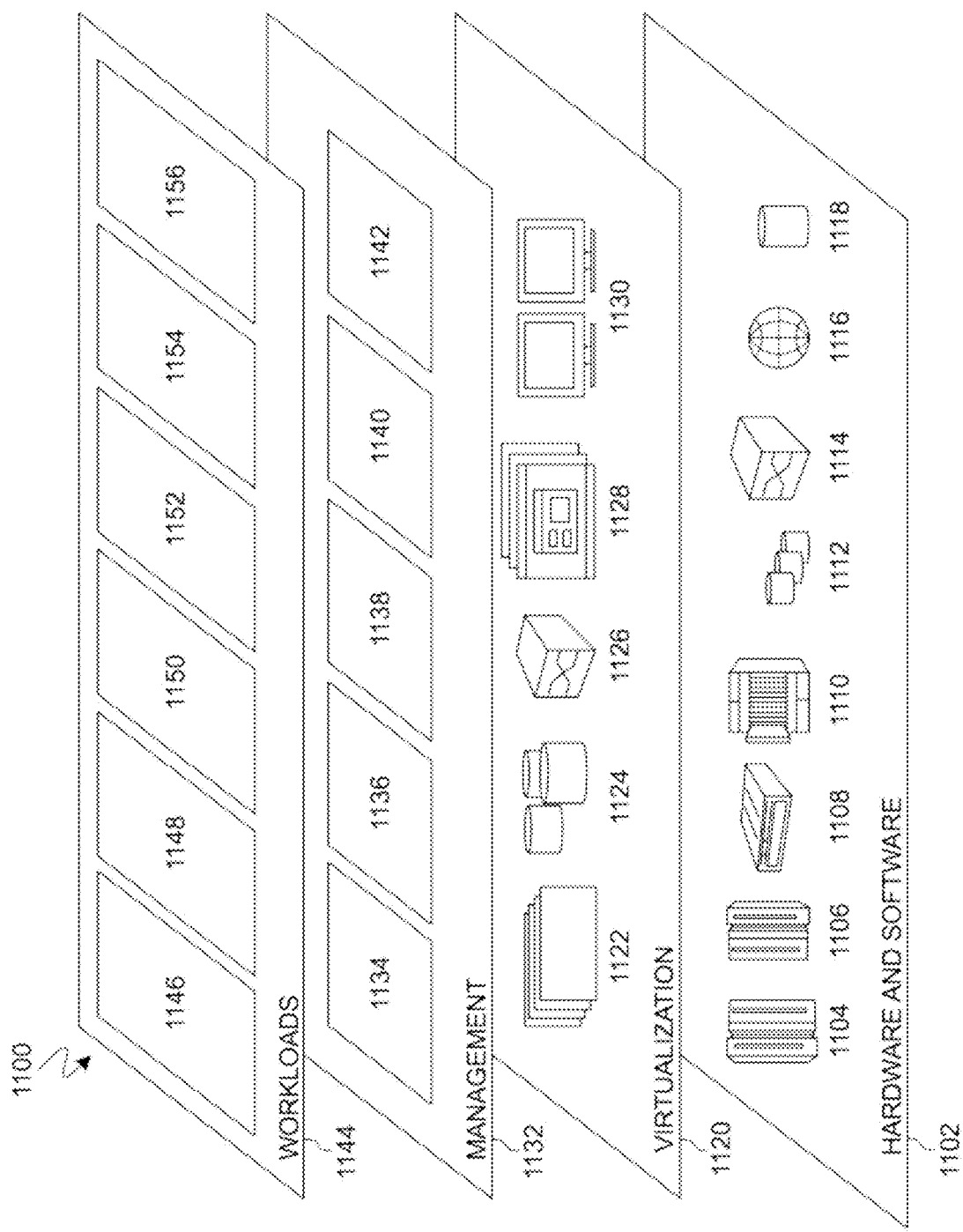
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and agribusiness support 1156. An agribusiness support program 110a, 110b provides a way to building a multi-dimension artificial intelligence (AI) agriculture advisor to support agribusiness, farmers and the agriculture industry globally.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for an artificial intelligence (AI) based agriculture advisor, the method comprising:
   receiving user data, as input from a user, the user data for the user including data corresponding to agricultural and business data of the user for use in a user profile for the user;
   collecting additional data and external data, the additional data including data collected by at least one sensor corresponding to one or more Internet of Things (IoT) devices and includes map data having a global positioning system (GPS) latitude and longitude, and data corresponding to growing conditions for at least one type of crop being harvested in the agricultural business of the user, and
   the external data being collected using at least one of a Web crawler, Internet bot, and automated software application which search and retrieve data from at least one source of a plurality of sources on a network, the search being dependent on user selected criteria, the external data being categorized by the at least one source and type of information and includes at least one of weather information, public services, agriculture news, financial news, logistics, scientific data, current global events, and collaborator data from supply chain agriculture advisors;
   creating the user profile for the user, the user data and the additional data corresponding to the user, and combined and stored in a repository on a computer readable storage medium;
   preparing and transforming the external data, wherein the external data is used to create transformed data;

conducting a hypothesis on the transformed data using advanced text analytics on unstructured data to build scenarios;

validating the transformed data using the scenarios built by the conducting the hypothesis and merging conflicting data using reliability scores, wherein a less reliable source is associated with a lower reliability score for the data;

training an AI model based on the transformed data, wherein training comprises one of supervised, unsupervised and a combination of both supervised and unsupervised training;

validating and retraining the AI model at a periodic interval responsive to new data;

matching the user data with the AI model;

ranking results based on the matching the user data with the AI model; and transmitting the ranked results electronically to the user, wherein the ranked results include cost benefit analysis information for a plurality of crop harvest types and associated financial investment, expected yields, and risk classification to assist the user in managing the agricultural business of the user.

2. The method of claim 1, further comprising:

wherein the transmitting the ranked results to the user is via at least one of an electronic alert, e-mail, text message and a Web-based application connected to a cloud infrastructure, and is capable of being received by both a smart mobile device and a stationary personal computing device operated by the user; and receiving feedback from the user to provide further training to the AI model.

3. The method of claim 1, wherein the user data includes at least one of a name, a company name, an address, an initial budget, one or more types of crops being harvested, a location of at least one farm corresponding to the one or more types of crops being harvested, farm resources, employee information, and a number of employees.

4. The method of claim 1, wherein the additional data includes local data obtained by the one or more IoT devices and external data obtained from sources over a network such as the Internet including soil mixture data, types of soil used for farming, pH values of the soil, weather conditions, topology data, geology data, map application data, global positioning system (GPS) data, an average temperature, electrical conductivity, a percentage of exchangeable sodium and an atmospheric pressure.

5. The method of claim 4, wherein the external data includes both structured data and unstructured data and the external data is wrangled to enable the structured data and unstructured data to be analyzed together, wherein the external data is normalized to consistently merge data from multiple datasets of the at least one source, and wherein transforming the external data generates the structured data for training a machine learning model and the unstructured data for use with text analytics including answer justifying documents to support a hypothesis.

6. The method of claim 1, wherein the preparing and transforming of the external data includes data wrangling of the data to enable normalizing the external data, creating an answer justifying document (AJD) using the normalized external data and converting the normalized external data into a machine learning model format for use in training the AI model.

7. The method of claim 1, wherein the conducting the hypothesis includes building one or more scenarios based on a type of product, wherein the conducting the hypotheses is used to validate and merge conflicting data.

8. The method of claim 1, wherein the training the AI model includes using neural networks, a subject matter expert (SME) input, supervised learning and semi-supervised learning to train the AI model.

9. A computer system for an artificial intelligence (AI) based agriculture advisor, comprising:

one or more processors, one or more computer-readable storage media, and program instructions stored on at least one of the one or more computer-readable storage media, wherein execution of the program instructions cause the one or more processors to:

receive user data as input from a user for use in generating a user profile corresponding to an agricultural business of the user;

collect additional data and external data, the additional data including data collected by at least one sensor corresponding to one or more Internet of Things (IoT) devices and includes map data having a global positioning system (GPS) latitude and longitude, and the external data being collected using at least one of a Web crawler, Internet bot, and other automated software application designed to search and retrieve data from at least one source of a plurality of sources on a network, the external data being categorized by the at least one source and type of information and includes at least one of weather information, public services, agriculture news, financial news, logistics, scientific data, current global events, and collaborator data from supply chain agriculture advisors;

create the user profile for the user, the user data and the additional data corresponding to the user and being combined and stored in a repository on a computer readable storage medium;

prepare and transform the external data, wherein the external data is used to create transformed data;

conduct a hypothesis on the transformed data to build scenarios;

validate the transformed data using the scenarios built by the conducting the hypothesis and merging conflicting data using reliability scores;

match the user data with an AI model, the AI model having been trained using the transformed data and updated at a periodic interval responsive to new data;

rank results based on the matching the user data with the AI model; and transmit the ranked results electronically to the user.

10. The computer system of claim 9, wherein the transmitting of the ranked results to the user is via at least one of an electronic alert, e-mail, text message and a Web-based application connected to a cloud infrastructure, and is capable of being received by both a smart mobile device and a stationary personal computing device operated by the user, the ranked results including cost benefit analysis information for a plurality of crop harvest types and associated financial investment, expected yields, and risk classification to assist the user in managing the agricultural business of the user; and further comprising program instructions to receive feedback from the user to provide further training to the AI model.

11. The computer system of claim 9, wherein the user data includes at least one of a name, a company name, an address, an initial budget, one or more types of crops being harvested, a location of at least one farm corresponding to the one or more types of crops being harvested, farm resources, employee information, and a number of employees.

12. The computer system of claim 9, wherein the additional data includes local data obtained by the one or more IoT devices and external data obtained from sources over a network such as the Internet including soil mixture data, types of soil used for farming, pH values of the soil, weather conditions, topology data, geology data, map application data, global positioning system (GPS) data, an average temperature, electrical conductivity, a percentage of exchangeable sodium and an atmospheric pressure.

13. The computer system of claim 9, wherein the external data includes both structured data and unstructured data and the external data is wrangled to enable the structured data and unstructured data to be analyzed together,
    wherein the external data is normalized to consistently merge data from multiple datasets of the at least one source, and
    wherein transforming the external data generates the structured data for training a machine learning model and the unstructured data for use with text analytics including answer justifying documents to support a hypothesis, and
    wherein a less reliable source is associated with a lower reliability score for the data.

14. The computer system of claim 9, wherein the preparing and transforming of the external data includes program instructions to normalize the external data using data wrangling of the data, create an answer justifying document (AJD) using the normalized external data and convert the normalized external data into a machine learning model format for use in training the AI model.

15. The computer system of claim 9, wherein the conducting the hypothesis includes program instructions to build one or more scenarios based on a type of product, wherein the conducting the hypotheses is used to validate and merge conflicting data.

16. The computer system of claim 9, wherein the training the AI model includes using neural networks, a subject matter expert (SME) input, supervised learning and semi-supervised learning to train the AI model.

17. A computer program product for an artificial intelligence (AI) based agriculture advisor, comprising:
    one or more computer-readable storage media and program instructions stored on at least one of the one or more computer-readable storage media, the program instructions executable by a processor to cause the processor to:
    receive user data, as input from a user, for use in generating a user profile corresponding to an agricultural business of the user;
    collect additional data and external data, the additional data including data collected by at least one sensor corresponding to one or more Internet of Things (IoT) devices and includes map data having a global positioning system (GPS) latitude and longitude, and the external data being collected using at least one of a Web crawler, Internet bot, and other automated software application designed to search and retrieve data from at least one source of a plurality of sources on a network, the external data being categorized by the at least one source and type of information;
    create the user profile for the user, the user data and the additional data corresponding to the user and is combined and stored in a repository on a computer readable storage medium;
    prepare and transform the external data, wherein the external data is used to create transformed data, the preparing of the external data including integrating the data from the at least one source, the external data being normalized to consistently merge data from multiple datasets of the at least one source, and the transforming the external data generates structured data for training a machine learning model and unstructured data for use with text analytics such as answer justifying documents to support a hypothesis;
    conduct a hypothesis on the transformed data using advanced text analytics on the unstructured data to build scenarios;
    validate the transformed data using the scenarios built by the conducting the hypothesis and merge conflicting data using reliability scores, wherein a less reliable source is associated with a lower reliability score for the data;
    match the user data with the artificial intelligence (AI) AI model, the AI model having been trained using the transformed data and updated at a periodic interval responsive to new data;
    rank results based on the matching the user data with the AI model; and
    transmit the ranked results electronically to the user, wherein the ranked results include cost benefit analysis information for a plurality of crop harvest types and associated financial investment, expected yields, and risk classification to assist the user in managing the agricultural business of the user.

18. The computer program product of claim 17, further comprising program instructions to:
    transmit the ranked results to the user via at least one of an electronic alert, e-mail, text message and a Web-based application connected to a cloud infrastructure, and is capable of being received by both a smart mobile device and a stationary personal computing device operated by the user; and
    receive feedback from the user to provide further training to the AI model.

19. The computer program product of claim 17, wherein the user data includes a name, a company name, an address, an initial budget, one or more types of crops being harvested, a location of a farm and farm resources.

20. The computer program product of claim 17, wherein the additional data includes at least one of soil mixture data, types of soil used for farming, pH values of the soil, weather conditions, topology data, geology data, map application data, global positioning system (GPS) data, an average temperature, electrical conductivity, a percentage of exchangeable sodium and an atmospheric pressure, and the external data includes at least one of weather information, public services, agriculture news, financial news, logistics, scientific data, current global events, and collaborator data from supply chain agriculture advisors.

* * * * *